May 11, 1948.   J. M. BRADY   2,441,133
AUTOMATIC WEATHER DATA TRANSMITTING STATION UNIT
Filed Sept. 24, 1945   2 Sheets-Sheet 2

INVENTOR.
JAMES M. BRADY
BY
William D. Hall
ATTORNEY

Patented May 11, 1948

2,441,133

UNITED STATES PATENT OFFICE 2,441,133

AUTOMATIC WEATHER DATA TRANSMITTING STATION UNIT

James M. Brady, Washington, D. C., assignor to the United States of America as represented by the Secretary of War Application September 24, 1945, Serial No. 618,387

4 Claims. (Cl. 177—351)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to weather indicating equipment, and more particularly to miniature portable and automatic weather stations. These stations are of that type intended to be dropped bodily on terrain inaccessible by ordinary transportation but which may be reached by parachute or other remote manner.

It has been customary to establish minor weather stations in remote sections of a country, by laboriously transporting the parts of the equipment, together with the building to house same, and incidental items required for the operators' personal requirements. This has the disadvantage of being expensive, involving considerable time; requiring trained and experienced personnel; offering opportunities for irreparable damage, or errors and, during war times, offering opportunities for disclosing the whereabouts of such equipment to hostile elements. Such housing and equipment cannot be transported to geographically inaccessible locations, and, therefore, have to be omitted therefrom, no matter how desirable, important, or necessary the data therefrom may be.

It is an object of this invention to provide a new and improved weather station unit that will avoid one or more of the disadvantages and limitations of the prior art.

Another object of this invention is to provide a new and improved weather station unit that will register and transmit by electronic signals weather data obtainable by elements within its structure to a distant receiving station.

An additional object of the present invention is to provide a new and improved weather station unit that will operate automatically and without attention for a proximate predetermined period of time.

Still another object of this invention is to provide a new and improved weather station unit that may be dropped indiscriminately from a considerable height above, to land at a selected location below, without being liable to serious damage.

A further object of this invention is to provide a new and improved weather station unit that will be suitable for expeditious distribution from an airborne vehicle for location in predetermined terrain, and having an inherent capacity for positioning itself for effective development and transmission of signals.

In a particular form of this invention, a weather station unit consists of a housing including equipment and consisting of a shell diminishing from its base to its top to provide a low center of gravity therein and a tendency to stabilize its position on landing.

For a better understanding of the present invention, together with other and further objects thereof, reference is had to the following description taken in connection with the accompanying drawings, which are used to illustrate a particular form of the invention, while its scope will be pointed out in the appended claims.

Referring to the drawing.

Similar reference characters refer to similar parts throughout the drawing.

In the structure indicated, various parts are operated mechanically to illustrate an effective manner of functioning that can be best appreciated in a written and pictured description. In such form, the device is not waterproof and is, in fact, inoperable to a certain extent, if immersed continuously in water. The device, however, could be made substantially waterproof and operable for water conditions by closing-in the housing at the bottom and bulk-heading it so it will be light enough to float erectly, and keep the radiosonde above the water level. The waterproofing of the conductors could be provided for in a conventional manner. This arrangement will not be described in further detail in this specification.

Figure 1:
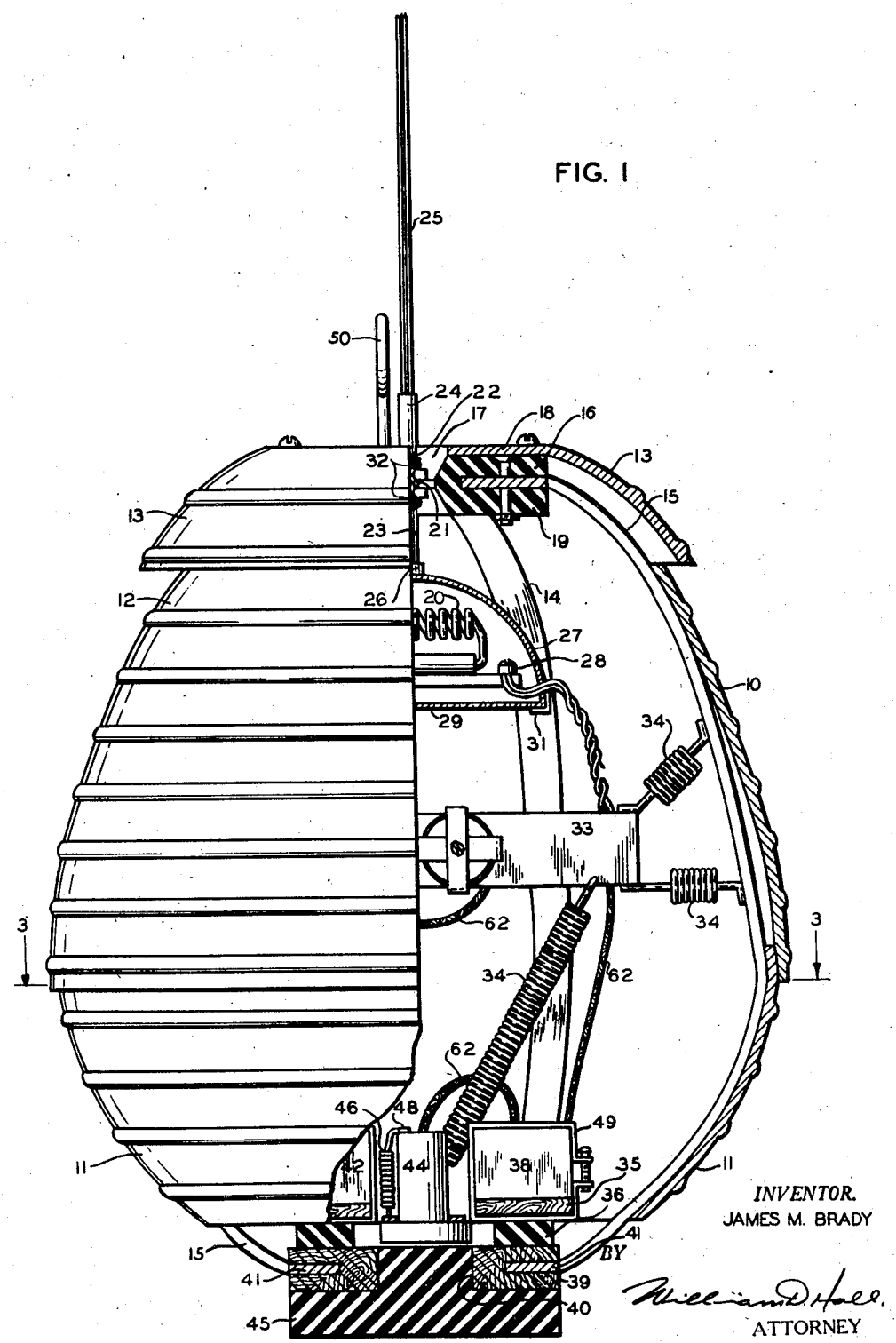
Figure 1 is a view in elevation partly in section to show the interior construction of a transmission station unit embodying this invention.
Figure 2:
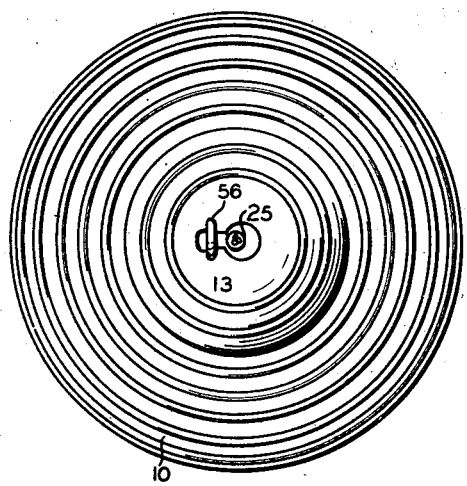
Figure 2 is a plan view of Fig. 1.
Figure 3:
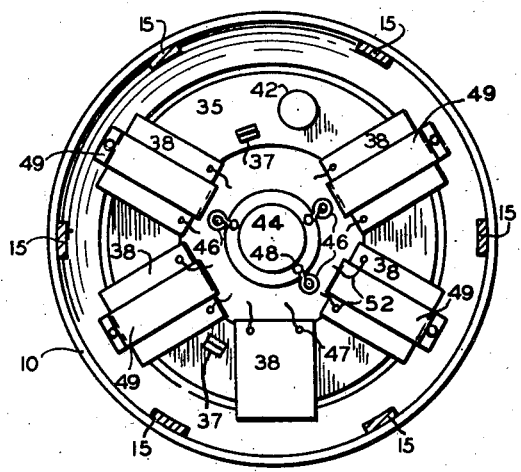
Fig. 3 is a sectional view of Fig. 1 on line 3—3 thereof.
Figure 4:
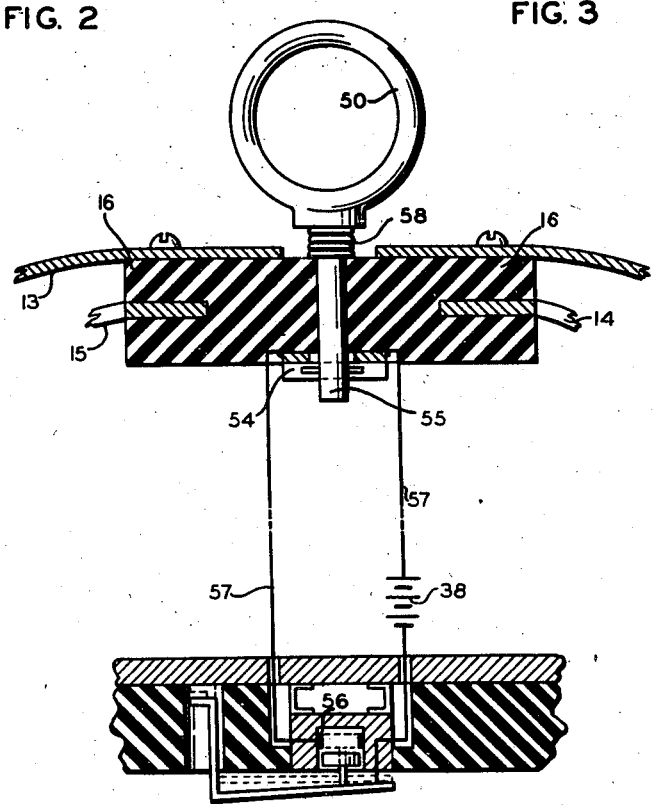
Figure 4 is a detail of the ring release used in this embodiment.

Referring particularly to Fig. 1, the housing 10 of the weather station unit consists of a lower shell 11, overlapped by a middle shell or body 12, and an extending cap shell or cowl 13, mounted respectively one above the other. These shells are preferably of thin, light sheet metal, such as aluminum, magnesium, or suitable alloys or compositions of the same. The shells are preferably corrugated in a horizontal direction, as indicated, to strengthen the structure, keep the shells aligned, and offer more resistance to rolling or twisting on the ground or medium with which it is in contact during placement or settlement thereon. The contour of the shells is arcuate and of quasi-spherical form, as indicated. The resultant form of the housing closely approaches that of an egg. The lower shell 11 is bulky compared with the middle shell or body 12 which overlaps it and diverges from the contour of the lower shell towards the top of the housing inside of the cap shell or cowl 13. The cap shell 13 extends beyond the lower shell 12, to form an umbrella over same and leave a ring-like peripheral opening around the top of the housing and operable access of the atmosphere to the instruments inside for ventilation purposes. The ribs 15 are arcuately formed and framed to conform with the general contour inside of the shells 12 and 13, and meet a circular insulating disc 16 at the top, which forms an apex for the framework. They extend into and are embedded in the insulation disc 16 and securely fasten thereto in any suitable manner. The disc has a central hole 17 tapered from both the upper and lower surfaces 18 and 19, respectively, to the middle thereof, in which a resilient swivel pedicel 21 is mounted and can oscillate around in. This pedicel is screw-threaded externally on its upper stem 22 for attachment to the coupling 24 of a stranded antenna 25, and on its lower stem 23 to a supporting terminal post 26. The terminal post 26 couples to the network 20 inside a hemispherical transparent housing 27 adjacent to it. The pedicel is of conducting material. The network 20 is that of a miniature radio transmitter of conventional circuits and equipment, and arranged for power coupling through terminals 28. Access is permitted to the interior of the housing 27, by the removal of the bottom plate 29, held on by the spring clips 31. The resiliency given the pedicel 21 is provided for by a coiled spring 32 mounted thereon. The whole transmitter is suspended from the pedicel 21. By the above arrangement, the transmitter housing and network 20 can turn or swing in any direction below the disc 16 within the housing 10, and, while doing so, carries the antenna 25 aligned with its axis in a corresponding direction.

A radiosonde 33 modified to have a self-winding characteristic from the conventional design but following the principles thereof, is suspended by a number of coil springs 34 connected with the ribs 15 and brackets 37 on a ring-like shelf 35, at various angles to guy it against shocks in any direction. The modified radiosonde is subject matter for another application by this inventor, and will not be detailed herein. The shelf 35 is preferably of a light plastic or wood, and serves as a support for the batteries 38. The ring-like shelf is supported on cushions 36 resting on a base plate 39. The frame 14 has its lower horizontally bent legs 41 of its ribs 15 embedded and bolted to this plate 39, and serves as the base for the framework 14. Other elements besides the batteries 38, such as a condenser 42, are mounted on the battery shelf 35 to add to the weight in this part of the housing 10, and keep the center of gravity of the unit as low as possible. The base plate 39 has a central hole 40 of sufficient dimensions and shape to permit the placement on electrical switching, horological, or clockwork mechanism 44 to be placed therein free from touching the base plate, but resting on a rubber-like mat 45 cemented to the under surface 46 of the plate 39. Coil springs 46 hold the mechanism 44 resiliently in place. They are attached at one end to bolts 47 on the base plate 39, and to bolts 48 on the instrument. The batteries 38 are secured to the shelf 35 by straps 49 adjustably bolted on to them and the shelf 35. An enlarged eye-bolt 50 is fastened securely to the disc 16 and serves as a handle for lifting or supporting the whole unit. Bolts 61 hold the cap shell 13 in place. Conducting wire 52 couples the incidental electrical parts together.

The unit is operated automatically by the surrounding atmospheric weather or other extraneous conditions about or around it, through the use of the radiosonde 33 or device having functions of a similar nature or influence on the electronic transmitter 20. The energy-generating means or batteries 38 provide power for the radiosonde 33, clockwork 44, and the transmitter 20 over a predetermined period of relatively long life. This radiosonde 33 registers atmospheric pressure, humidity, temperature and other desirable characteristics, or works in a predetermined manner by a horological mechanism 44. This type of equipment has been previously developed and is known to those skilled in the art, and, therefore, will not be detailed herein. The time clock 44 is used to control the operation of the radiosonde 33 and does so over a considerable period by maintaining intervals in between operations, in accordance with a predetermined arrangement. This arrangement may be a signal actuation every day, every hour, or other selected periods of time.

However, a particular feature of the unit is in its capacity to withstand hard usage during placement in a location. It is dropped from aircraft somewhat like a paracrate is in general use. This placement is intended to be made from an airplane, by dropping it, attached to a parachute. The parachute absorbs a large portion of the kinetic energy of the falling unit; but not so much as to prevent it striking the terrain with considerable force. The unit and its contents have to withstand the shock of such striking. This is accomplished by having the framework 14 and housing 10 arranged and equipped in the form indicated. Both are resilient and take up the shock fully under usual circumstances, and even if a deformation of considerable extent occurs, such does not allow the equipment inside to be hit or disorganized materially thereby. In addition, the various suspension springs 34 and 46 absorb the pulling stresses in all directions on the equipment, while the resilient pads add to this capacity and prevent destruction of the equipment. The parachute is attached to the self-releasing ring 50 of the unit, which is proximately situated over the axis of the housing 10, in order to keep it in a generally perpendicular position during falling. Since the equipment and contents provide a low center of gravity for the device, the structure tends to take in a predetermined perpendicular position. The base of the housing is flat and the sides rounded. Should the terrain tend to prevent this by being of nonhorizontal nature, the transmitter 27 and its antenna, by reason of the center of gravity of the same, freely move on the resilient swivel suspension and pedicel 21 to a more vertical direction. The ring 50 is made self-releasing through the use of an explosive, fusible cotter pin 54 passing through the shank 55 of the pin, and set off by a dash pot contact 56 through its incidental circuit 57. This dash pot contact is closed when the base plate 39 of the unit is brought close to the ground, and rests on same for a period of several seconds—sufficient to permit the air to leak from the dash pot and bring the contacts together. This energizes the circuit that will explode and burn out the fusible cotter pin 54. A spring 58 propels the ring away from the unit when the cotter pin 54 releases. This detaches the parachute or rope used for lowering the device and leaves it free. The dash pot feature is to provide a time interval so that a sudden pull by the parachute, a quick bump against terrain, or a knock by an operator in handling, will not set the unit free. It requires a definite stabilized settling to do so. The flexible stranded nature of the antenna, even though spot-welded together at various loci 53, enables it to withstand considerable bending and rough treatment without detrimentally preventing it from springing back to its normal straightened contour, after being temporarily bent over. The batteries are naturally heavy and form a very effective means for lowering the center of gravity of the unit and stabilizing it.

The housing shell 11 is spaced from the shell and base, together with that between shells 12 and 13, and permits ample access of the atmospheric medium to the equipment, especially the actuating elements of the radiosonde 33. The corrugated nature of the shells has already been discussed. The special features of the unit are in its capacity to withstand rough treatment, afford considerable radiation and sensibility to atmospheric conditions, provide a shield against extraneous electrical fields, and reduce the requirements for framework facilities.

In the terminology used in this specification, the language used has been directed mainly as the particular form indicated in the drawings, used as an example to illustrate the invention However, it is understood that substitution of equivalents may be done where such is comprehensive enough to be within the scope of the claims, without necessarily being illustrated or specifically referred to. For instance, the batteries shown might be substituted by a small generator activated by a spring or similar device already developed and known to the respective art, in order to come within the terminology of "electrical generating means."

In a similar manner, the other substitutions could be carried out within the meaning of the disclosure, without involving new matter, if required to mention such in detail. The unit is particularly intended for use on isolated terrain. The term terrain is interpreted herein to include, general land conditions, including, ground, rocks, trees and dwellings, and excluding water in the form of lakes, rivers, seas and general marine situations.

While there has been described what is at present considered to be a preferred embodiment of this invention, it will be obvious to those skilled in the art that various changes and further modifications may be made therein without departing from the spirit of the invention or the principles thereof. It is, therefore, intended in the appended claims to cover all such changes and modifications as fall within the true spirit and scope of the invention.

What is claimed is:

1. A signal transmitting station for terrain operation comprising in combination, a housing converging from its base to its top to provide relatively large bulk adjacent its lower portion, said top of the housing including a cowl extending so as to provide an opening in the housing to permit access of the atmosphere to the interior thereof, a transmitter resiliently suspended interiorly from said housing adjacent its top having an antenna projecting therefrom for the transmission of signals, means in the housing for operating the transmitter, and electrical energy generating means for the transmitter located adjacent said bottom for stabilizing the housing, said resilient suspension being arranged to provide sufficient cushioning to said transmitter inside of the housing to enable it to take up the shock of dropping the station onto terrain from a considerable height without such injury to said transmitter as to make it inoperative.

2. An automatic signal transmitting unit for terrain operation comprising in combination, a quasi-egg-shaped housing converging predeterminedly so as to provide relatively large bulk adjacent its bottom, a transmitter resiliently suspended from the interior surfaces of said housing adjacent its top portion having an antenna projecting externally therefrom for the transmission of signals, and means for operating the transmitter in predetermined sequence disposed within the housing so as to stabilize same, said housing being provided with an open space in its walls to permit the free access of the atmosphere to the interior thereof and to operate said means.

3. An automatic weather station unit for terrain operation comprising in combination, a housing of regular form converging from its base to its top to provide relatively large capacity adjacent to its bottom, said housing having an opening to permit air to enter a transmitter resiliently suspended from said housing adjacent its top having an antenna projecting externally therefrom for the transmission of signals, means, resiliently mounted, for operating the transmitter in accordance with characteristics of the weather as derived from the atmosphere accessible into said housing, and energy-generating means for the transmitter disposed in the housing so as to stabilize the unit in a predetermined position, said resilient suspension of the transmitter being arranged to absorb shocks thereto caused by dropping said unit onto said terrain that might affect the automatic operation of the transmitter.

4. An automatic weather station unit for isolated terrain operation comprising in combination, a housing self-erecting on its base, an electronic signal transmitter internally and resiliently suspended from said housing having a flexible and stranded antenna projecting externally therefrom for the transmission of electronic signals of predetermined type, radiosonde means for operating the transmitter in coordination with atmospheric conditions, and electrical means for energizing the transmitter disposed in the housing and positioned to facilitate the self-erection of the unit, said transmitter and means being so coordinated in the housing as to operate automatically together and provide capacity in the unit to withstand shocks due to the unit being dropped onto said terrain sufficient to keep said transmitter and means in operable condition.

JAMES M. BRADY.

REFERENCES CITED

The following references are of record in the file of this patent:

UNITED STATES PATENTS

| Number | Name | Date |
|---|---|---|
| 1,913,512 | Reynolds | June 13, 1933 |
| 2,027,367 | Blair | Jan. 14, 1936 |
| 2,149,808 | Ellis | Mar. 7, 1939 |
| 2,287,786 | Diamond | June 30, 1942 |
| 2,310,017 | Canon | Feb. 2, 1943 |
| 2,347,160 | Wallace | Apr. 18, 1944 |
| 2,397,844 | Dewhurst | Apr. 2, 1946 |

FOREIGN PATENTS

| Number | Country | Date |
|---|---|---|
| 135,441 | Great Britain | Nov. 27, 1919 |